United States Patent [19]

Hehl

[11] 4,290,317

[45] Sep. 22, 1981

[54] PRECISION DRIVE FOR ROTARY SWITCHING CONTROLS OF RECIPROCATING UNIT

[76] Inventor: Karl Hehl, Arthur-Hehl-Strasse 32, 7298 Lossburg 1, Fed. Rep. of Germany

[21] Appl. No.: 63,600

[22] Filed: Aug. 6, 1979

[30] Foreign Application Priority Data

Aug. 5, 1978 [DE] Fed. Rep. of Germany ....... 2834415

[51] Int. Cl.³ ................ F16H 27/02; F16H 29/02
[52] U.S. Cl. ............................. 74/89.2; 425/150; 474/257
[58] Field of Search .......... 74/89.2, 89.21, 89.22, 74/99 R, 108, 501 R; 425/150; 33/172 R

[56] References Cited

U.S. PATENT DOCUMENTS

| 283,627 | 8/1883 | Logan | 33/172 R |
|---|---|---|---|
| 2,585,368 | 2/1952 | Carroll | 33/172 R |
| 3,524,219 | 8/1970 | Gersbeck | 425/150 |
| 3,647,309 | 3/1972 | Thompson | 425/150 X |
| 3,850,560 | 11/1974 | Farrell | 425/150 |
| 3,852,739 | 12/1974 | Mohr | 74/89.21 X |

FOREIGN PATENT DOCUMENTS

| 668141 | 8/1963 | Canada | 74/89.20 |
|---|---|---|---|
| 1948929 | 4/1971 | Fed. Rep. of Germany | 74/89.21 |
| 484883 | 9/1953 | Italy | 74/89.21 |

*Primary Examiner*—Lawrence J. Staab
*Attorney, Agent, or Firm*—Joseph A. Geiger

[57] ABSTRACT

A precision drive for a rotary potentiometer measuring the lineal displacements of a reciprocating machine unit, for the generation of switching signals, the drive including a control disc which is coaxially coupled with the potentiometer and driven by means of a timing belt which is attached to the moving unit. The drive belt may form a closed loop around a return roller which is carried by a guard case, it may have opposite angled-off runs of which one is preloaded for tension, or it may have one extremity attached to the control disc, under a torque bias.

4 Claims, 8 Drawing Figures

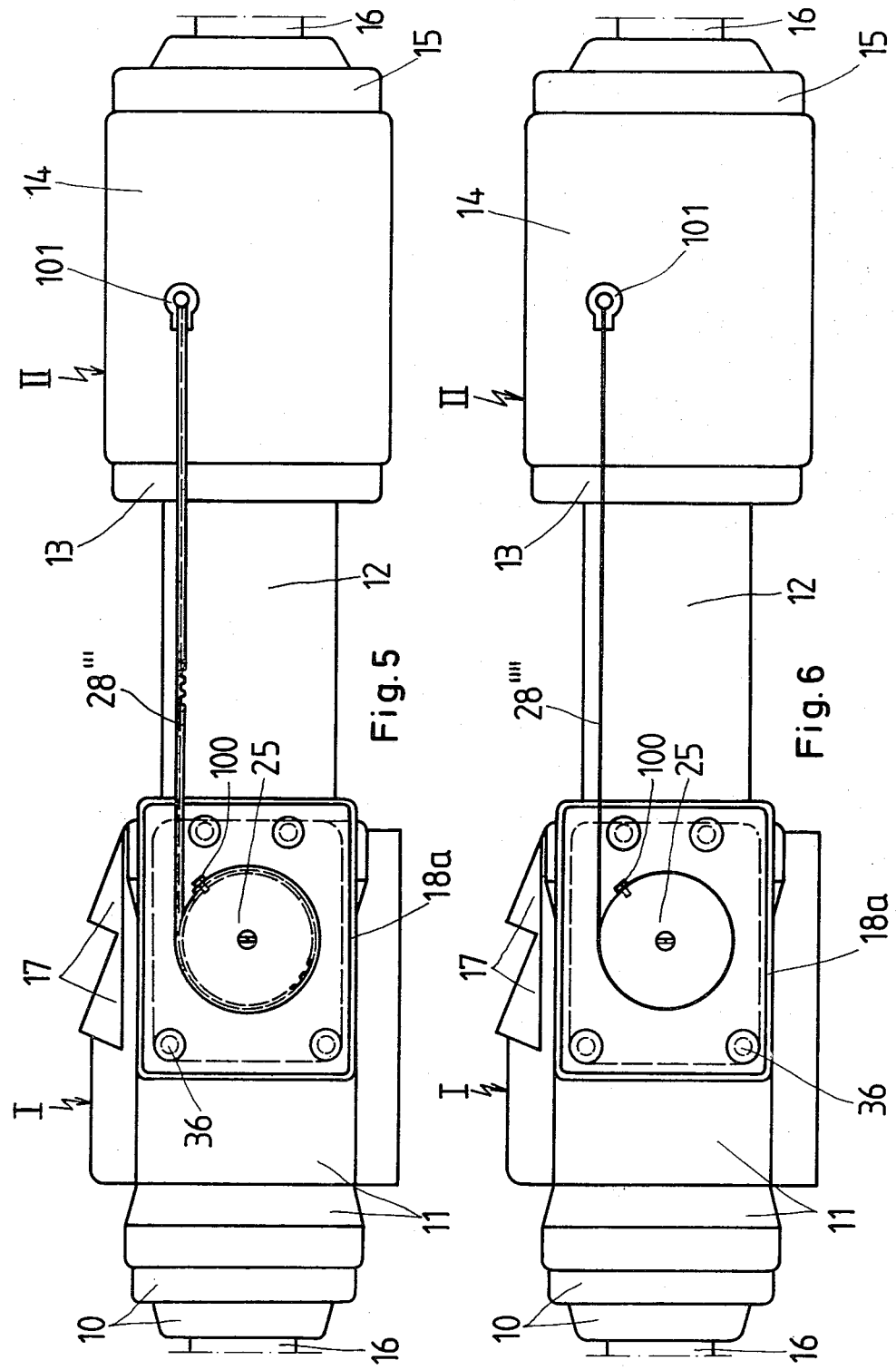

PRECISION DRIVE FOR ROTARY SWITCHING CONTROLS OF RECIPROCATING UNIT

BACKGROUND OF THE INVENTION

1. Field of the Invention

The present invention relates to control devices for repetitive limit switching, and, more particularly, to a precision drive for adjustable rotary switching controls of a reciprocating unit, such as the injection unit of an injection molding machine.

2. Description of the Prior Art

The production of high-quality injection-molded parts requires very precise and consistently responding limit switches for the injection unit of the injection molding machine, especially for the switching signals which start and stop the movement of the plastification screw of the injection unit. These signals determine the exact quantity of plastic material which is being injected into the injection molding die.

One prior art solution to this problem involves the use of a control device which measures the lineal displacement of the moving assembly by converting that displacement into an angular displacement of a rotatable control disc and a connected angular pulse giver whose circumferential profile is being scanned by means of an optical scanner. The lineal motion of the moving machine unit is transmitted to the control disc—which, in the case at hand, is a pinion of small diameter—by means of a precision-ground gear rack whose extremity is fixedly attached to the moving machine unit. The control disc executes several revolutions over the extent of the total lineal displacement. The result is a displacement measurement and switching action whose accuracy and reproducibility are adequate for normal requirements, though obtained with a comparatively expensive device.

Also known from the prior art is an approach which involves the use of a linear potentiometer for the measurement of the displacement of the movable machine unit and for the generation of appropriate switching pulses. One shortcoming of these devices is that linear potentiometers consist of coils which are wiped in the axial direction, with the result that the reading accuracy is less than optimal. This accuracy suffers further, when, as a result of long-run operation, wear-produced clearances affect the accuracy of guidance between the linear potentiometer coil and the wiper.

SUMMARY OF THE INVENTION

In the course of further research and experimentation, it was found, rather unexpectedly, that the prior art devices described above can be improved, to achieve a still greater accuracy of displacement measurement, for the production of high-precision molded parts, if, as suggested by the present invention, the drive member for the control disc is a flexible but non-stretchable roll-off member, and particularly, if the flexible member is a steel-reinforced belt, or a thin steel belt, mounted under tensile preload, so that only tensile force transmission to the control disc and rotary potentiometer takes place.

The superiority of the proposed solution over the prior art solution, in terms of greater accuracy of displacement measurement and switching pulse generation, becomes more evident, when compared under long-run usage, when wear enters into consideration. It becomes particularly pronounced, when the devices under comparison are employed in conjunction with older injection molding machines, where many years of operation under heavy loads have produced a certain amount of clearance between the guide surfaces of the tie rods and the cooperating guide and supporting surfaces of the machine unit which is carried on the guide rods, with the result that the precise positioning of the rigid gear rack is no longer assured. It becomes impossible to compensate for these guide clearances, even by resorting to minimal tolerances in the teeth of the precision-ground gear rack, because the centering errors of the gear rack with respect to the control disc are multiplied, due to the length of the rack.

The solution proposed by the present invention not only has the advantage of higher durability and consequent long-run accuracy of performance, especially under extended continuous usage, it also is a considerably less expensive device, in terms of production costs, assembly, and servicing requirements. In most cases, furthermore, the suggested improved device requires less space than a comparable prior art gear rack drive.

BRIEF DESCRIPTION OF THE DRAWINGS

Further special features and advantages of the invention will become apparent from the description following below, when taken together with the accompanying drawings which illustrate, by way of example, several embodiments of the invention which are illustrated in the various figures as follows:

FIG. 5 and FIG. 6 show two more control devices of similar construction embodying the invention.

DESCRIPTION OF THE PREFERRED EMBODIMENTS

The various figures of the drawings show portions of a typical injection unit of an injection molding machine, such an injection unit having as a rule a pair of horizontally oriented fixed tie rods 16 which extend longitudinally through the injection unit. On their forward portions, the tie rods 16 carry a machine unit I of which the main part is a carrier assembly 11 which supports the plastification cylinder and the granulate hopper. On the rear portions of the tie rods 16 is arranged a machine unit II whose main part is a drive housing 14, enclosing a hydraulic drive for the plastification screw (not shown).

In the injection stroke of the injection unit, the hydraulic drive of the machine unit II advances the drive housing 14 along the tie rods 16, towards the carrier assembly 11, thereby advancing the plastification screw axially inside the plastification cylinder, so as to inject the plastified raw material from the plastification cylinder into the injection molding die.

Figure 1:
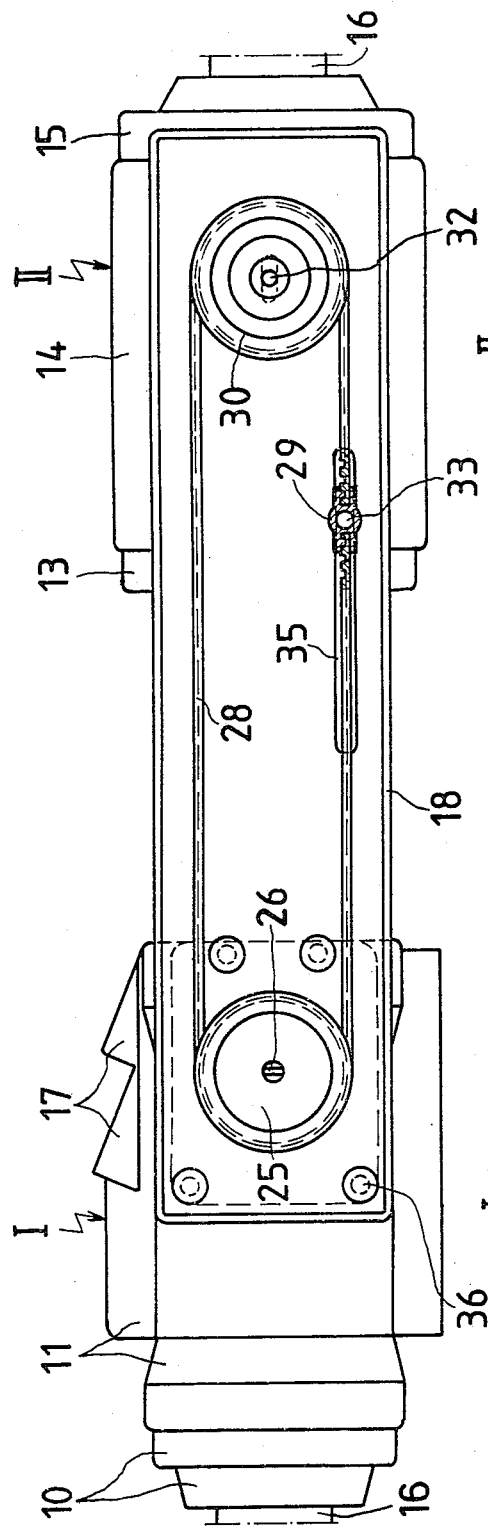
FIG. 1 shows, in an elevational view, an injection unit of an injection molding machine, incorporating therein a control device embodying the present invention, the cover of the guard case having been removed.
Figure 2:
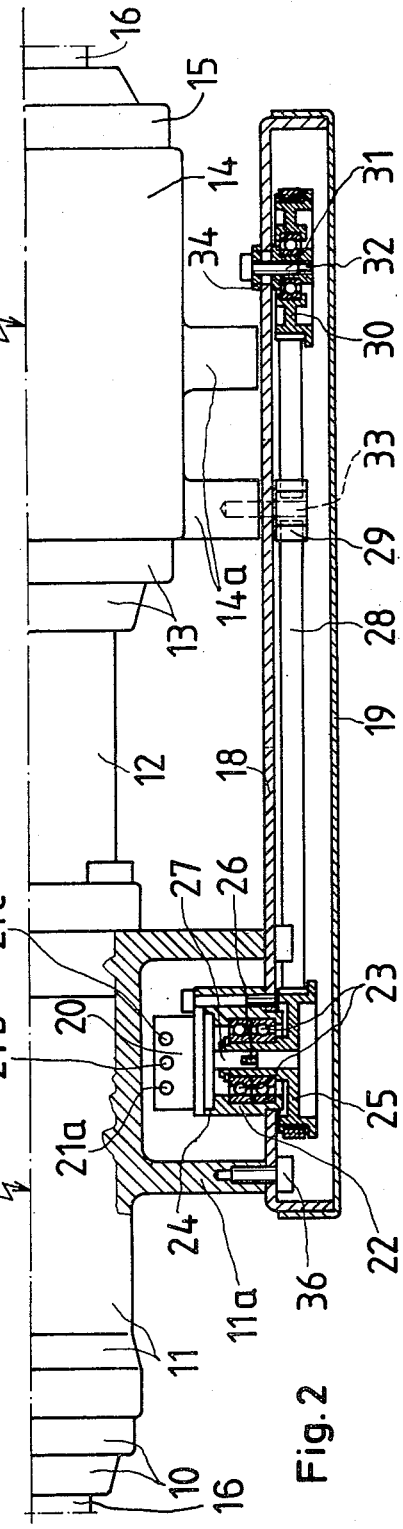
FIG. 2 shows a lateral portion of the injection unit of FIG. 1, in a plan view and partially cross-sectioned.

FIGS. 1 and 2 illustrate portions of a typical injection unit, FIG. 2 showing only one-half of the left branch of such a unit. The plastification cylinder and plastification screw, and the granulate hopper are arranged centrally between the two parallel tie rods 16 and centrally above the tie rods, respectively. The drawing shows the mounting base 17 for the granulate hopper and a front cover 10 surrounding each tie rod 16 at the forward end of the carrier assembly 11. The drive housing 14 of machine unit II has similar front and rear housing covers 13 and 15, respectively. The front housing covers 13, however, have larger bores than the other covers, surrounding a pair of piston sleeves 12 in a concentric arrangement with the tie rods 16. The forward extremities of the piston sleeves 12 are attached to the carrier assembly 11 by means of flanges and clamping screws. Rearwardly, the sleeves 12 reach into the drive housing 14, where they carry pistons (not shown), as part of the hydraulic drive system which produces the injection stroke of the injection unit.

In FIG. 2, it can be seen that the carrier assembly 11 of machine unit I further includes a rotary switching pulse giver in the form of a control disc 25 and a connected rotary potentiometer housing 20. This pulse giver is accommodated inside a pot-shaped housing extension 11a of the body of the carrier assembly 11. The housing extension 11a has a generally rectangular outline, presenting a flat vertical mounting face in parallel alignment with the orientation of the tie rods 16. To this mounting face is attached the bottom portion 18 of an elongated guard case, in the shape of a narrow rectangular container which reaches rearwardly over the drive housing 14 of machine unit II. The guard case bottom 18 is fixedly attached to the carrier assembly 11 by means of clamping screws 36. Over the guard case bottom 18 is fitted a guard case cover 19.

The guard case bottom 11 has a bore in the center of that portion which reaches over the cavity of the housing extension 11a, and centered in that bore is a mounting sleeve 22 which carries the rotary switching pulse giver. For this purpose, the potentiometer housing 20 has a centering collar 24 with which it engages a matching centering recess in the rear portion of the mounting sleeve 22. In the forward portion of sleeve 22 is arranged a seat for a pair of precision ball bearings 23 which carry a hollow shaft extension of the control disc 25. A suitable drive dog 26 provides a clearance-free rotary connection between the control disc 25 and a coaxial shaft extension 27 of the potentiometer wiper (not shown).

The rotary potentiometer has a stationary arcuate resistive track of less than 360 degrees angular extent, presenting a homogeneous resistance layer to a rotatable wiper whose initial angular position is at point 21b. The points 21a and 12c indicate the beginning and the end of the resistive track inside the potentiometer housing 20. A rotation of the control disc 25 by a predetermined angle produces a corresponding rotation of the wiper along the resistive track, and the resistance differential on both sides of the wiper can be interpreted as an accurate reflection of the position of the wiper angle and hence of the position of the movable machine unit II with respect to the machine unit I. Using appropriate circuitry, the establishment of a predetermined resistance differential can be made to trigger a switching signal which then can be used to open or close an electrical circuit which controls a solenoid valve or the pump of the hydraulic drive which produces the injection stroke.

The control disc 25 has on its circumference a series of straight teeth which are engaged by a flexible drive member, preferably a timing belt 28 which transmits only tangential tensile forces to the control disc 25. Timing belts as such are, of course, well known as slip-free drive components (see, for example, German Auslegeschrift No. 20 14 538). As can further be seen in FIG. 1, the timing belt 28 is an endless member, running over the control disc 25 and over a return guide roller 30 of identical diameter, so that both belt runs are parallel to the tie rods 16. The return guide roller 30 also serves as a tensioning roller, being adjustably mounted on the guard case bottom 18, near its rear extremity. For this purpose, the guard base bottom has an appropriate oblong hole through which extends a clamping screw 31 which is supported against a washer 34 and holds a bearing stud 32 with a ball bearing that carries the return guide roller 30.

The timing belt 28 is a belt length portion which is cut from a bulk length of belt material. The two cut extremities are connected by means of a follower clamp 29 which also serves as a belt anchoring member, attaching the lower belt run to the movable machine unit II, more precisely, to the side of the screw drive housing 14. This attachment is obtained by means of a follower pin 33 which is attached to the housing 14 and which engages a matching bore in the follower clamp 29, reaching through a longitudinal slot 35 in the guard case bottom 18. The length of the slot 35 is such that it can accommodate the maximum relative displacement between the machine units I and II.

The return guide roller 30 is adjusted in such a way that the timing belt 28 is at all times subjected to a tensile preload, so that the displacement of the machine unit II is transmitted to the control disc 25 as a tensile force, whether the machine unit moves rearwardly or forwardly. The result is an absolutely backlash-free measurement of the longitudinal displacements of the drive housing 14 and of the plastification screw which is rotatably carried by the latter.

Figure 3:
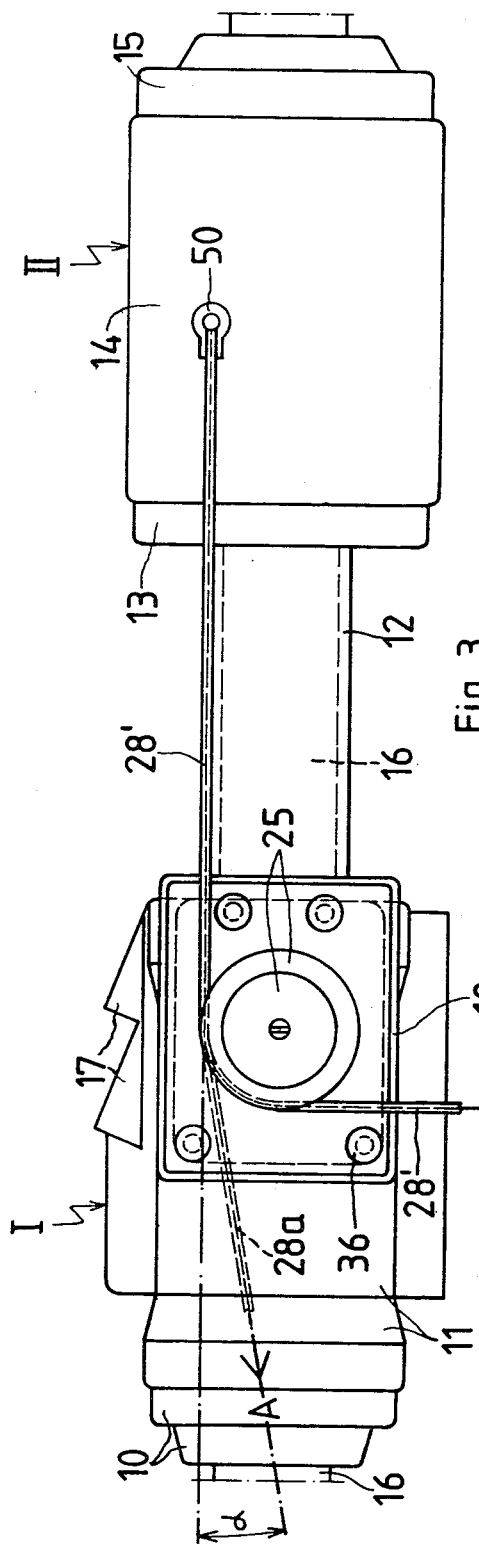
FIG. 3 shows, in an elevational view which is similar to that of FIG. 1, an injection unit with a different control device, representing a second embodiment of the invention.

In FIG. 3 of the drawing is shown as modified embodiment of the invention which differs from that previously described primarily by the configuration of the timing belt 28'. In this embodiment, the timing belt 28' no longer froms a closed loop, running over the control disc 25 and a return guide roller of identical size; instead, one extremity of the timing belt 28' is fixedly attached to the drive housing 40 by means of an attachment clamp 50, while the other extremity of the timing belt 28' leaves the control disc 25 is a substantially vertical direction, after an angle of contact of approximately 90 degrees. To the second extremity of the timing belt 28' (not shown in the drawing) is attached a weight which, accordingly, exerts on the timing belt 28' a tensile preload in the direction of arrow B.

It follows that the weight which is attached to the extremity of the vertical run of the timing belt 28' executes vertical displacements which are identical in size to the horizontal displacements of the machine unit II, thereby driving the control disc 25 in a backlash-free manner. The result is the same as with the embodiment of FIGS. 1 and 2, except for the fact that the direction of rotation of the control disc 25 is reversed. For an accurate operation of this device, it is important that the orientation of the horizontal run of the timing belt 28' be exactly parallel to the axes of the tie rods 16.

FIG. 3 further shows, in dotted lines, an alternative orientation of the tensioning run 28a which would be utilized in conjunction with the attachment of a tension spring to that extremity. In the example shown in dotted lines, the direction A in which the tensioning run 28a is being pulled deviates by only a small angle α from the orientation of the attached run 28'. However, even this small angle of circumferential contact with the control disc 25 will at all times produce a contact of at least two timing belt teeth, which is sufficient for the proper operation of the device.

The embodiment of FIG. 3 does not require a guard case which extends rearwardly beyond the extent of the timing belt and which carries the tensioning guide roller. Instead, the guard case can be very small, surrounding only the control disc 25 and having appropriate horizontal and vertical openings for the entry and exit of the runs of the timing belt 28'.

Figure 4:
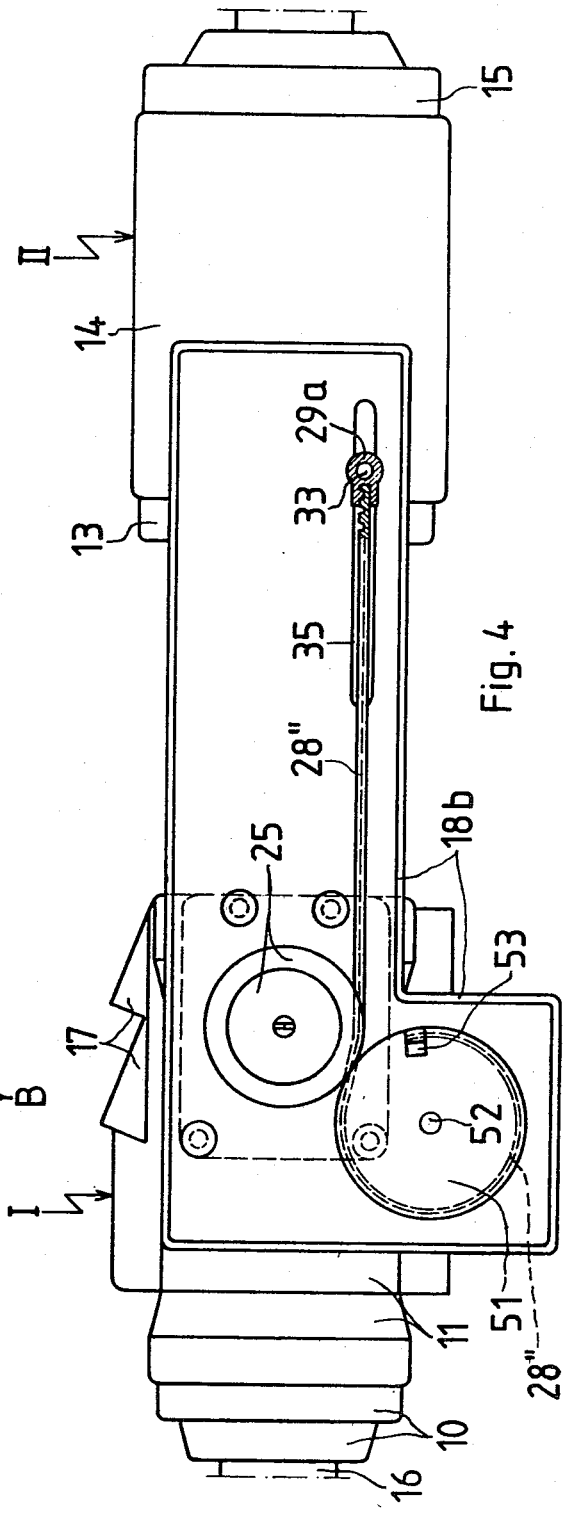
FIG. 4 is likewise similar to FIG. 1, showing a third embodiment of the invention.

In FIG. 4 is illustrated still another embodiment of the invention which employs a timing belt 28'', in an arrangement which is somewhat similar to that of FIG. 3, inasmuch as the connection between the timing belt 28'' and the movable machine unit II is likewise arranged on one extremity of the timing belt. This attachment involves a follower clamp 29a and a follower pin 33 which is anchored in the side of the drive housing 14. However, this embodiment features a guard case (of which only the bottom portion 18b is shown) which reaches longitudinally beyond the follower clamp 29a, so as to enclose the entire device. The other run of the timing belt 28'' again contacts the control disc 25 over only a small angle, after which it reverses its direction to be wound onto a spring drum 51 which is supported on a bearing stud 52 inside the housing extension 11a of the machine unit I. This way, the space requirements for the tensioning run of the timing belt are minimized, while the timing belt is under a preload at all times. The direction of rotation of the control disc 25 is the same as in the case of the embodiment of FIGS. 1 and 2. It should be understood that the guard case of the embodiment of FIG. 3 could likewise be extended rearwardly to fully enclose the timing belt 28' and its attachment clamp 50, as is the case with the embodiment of FIG. 4. This, of course, requires the arrangement of an appropriate longitudinal slot 35 in the guard case bottom 18b, the length of the slot being at least equal to the maximum relative displacement between the machine units I and II.

FIGS. 5 and 6 show two embodiments of the invention which represent further simplifications, as compared to the previously described embodiments, inasmuch as the control disc 25 also serves as a preload producing member. In this case, the timing belt 28''' does not have a tensioning run which leaves the control disc, but its one extremity is simply attached to a point 100 on the periphery of the control disc 25. A torque-producing spring which is associated with the control disc 25 produces the required preload in the timing belt 28'''. The horizontal run of the timing belt 28''' is again exactly parallel to the tie rods 16 and its extremity is attached to the drive housing 14 by means of an attachment clamp 101.

FIG. 6 shows that the use of a timing belt is not a necessary and exclusive prerequisite of the present invention, but that it is readily possible to use in the place of the timing belt a thin steel belt 28'''' which fulfills exactly the same function as the timing belt in FIG. 5. The tensioning extremity of the flexible drive member is again attached to the periphery of the combined spring drum and drive disc 25 at a peripheral attachment point 100. The guard case, as represented by the guard case bottom 18a in FIGS. 5 and 6, is shown to be of minimal size requiring only one opening for the movements of the timing belt 28''' or steel belt 28''''.

It should be understood, of course, that aside from the described timing belt and steel belt, other flexible non-stretchable drive members could be used to obtain the roll-off drive connection between the movable machine unit II and the control disc 25 on the machine unit I. Among these alternatives would be a roller chain, a length of piano wire, a perforated steel tape, a steel-reinforced flat woven belt, or even a V-belt, in cooperation with a V-belt pulley, if the parts are sufficiently precise and consistant in their dimensions.

It should be noted that in the embodiments of FIGS. 5 and 6, where the tensioning extremity of the flexible drive member is attached directly to the circumference of the control disc 25, a slip-free circumferential contact is assured by virtue of this attachment, so that no teeth are required on the disc periphery and on the drive member. The preload producing spring may be arranged either inside the control disc 25 itself, or it may be arranged inside a separate spring drum, in which case the latter is directly coupled to the control disc 25.

Figures 7, 8:
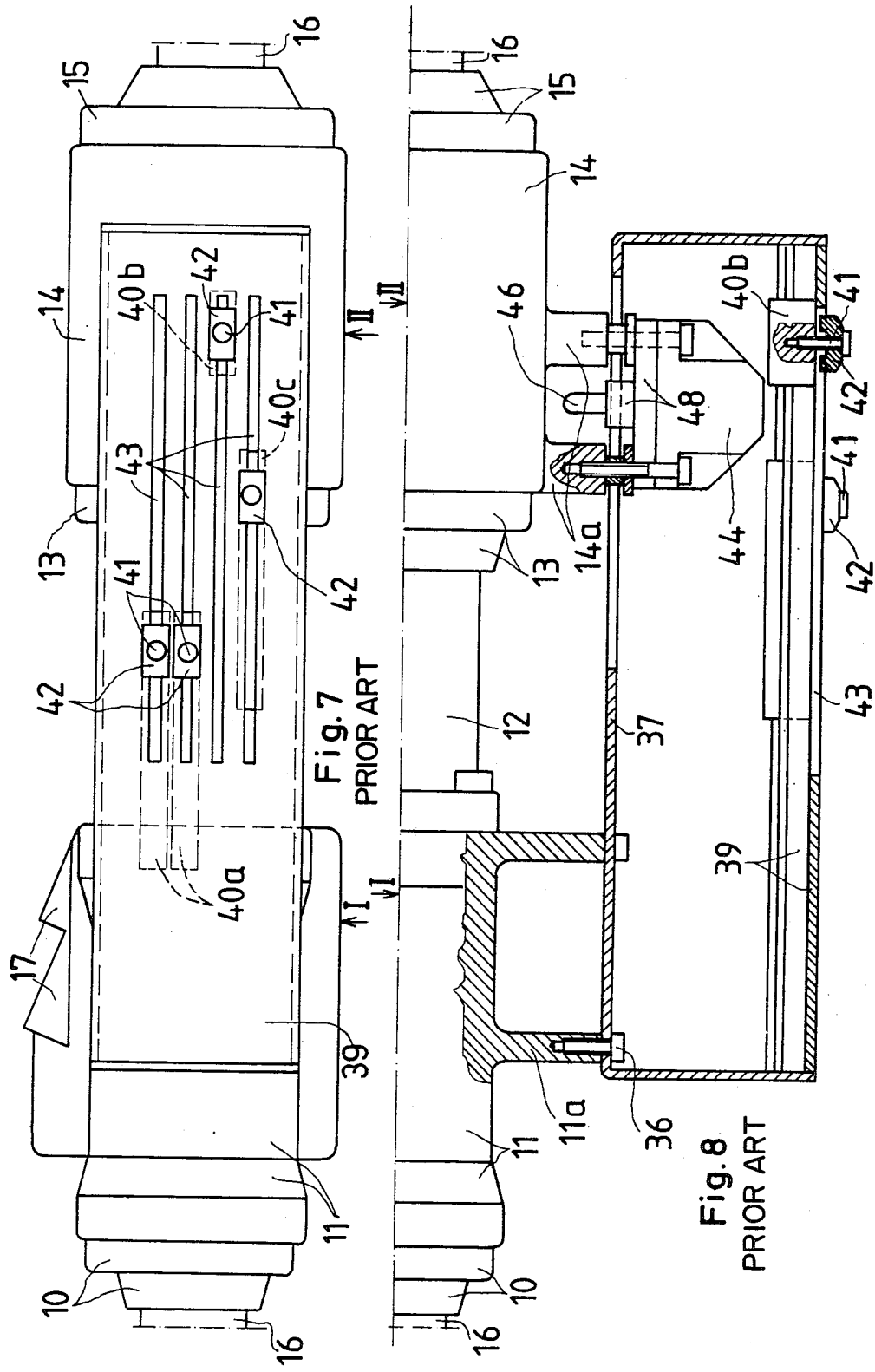
FIG. 7 and FIG. 8 show the injection unit of FIGS. 1 and 2, as equipped with a known prior art control device which is interchangeably mounted in the place of the control device of FIGS. 1 and 2, using adjustable control cams and proximity switches instead.

In FIGS. 7 and 8 is shown a known predecessor version of a switching control device which is adapted for attachment to the same injection unit as is shown in FIGS. 1 and 2 of the drawing. In fact, the injection unit is so designed that the two devices are interchangeable against each other and that the machine purchaser has a choice between using the known device or the novel device of the invention, depending on the quality requirements which the injection-molded parts have to meet. Where the invention proposes to use a guard case 18, 19, the prior art version uses a similarly shaped switch housing 37, 39, which is attached to the same lateral face of the housing extension 11a of carrier assembly 11.

To the mounting sockets 14a of the drive housing 14 is attached a switch carrier 44, the attachment screws and an electrical connection reaching through a longitudinal slot in the bottom 37 of the switch housing. Cooperating with the proximity switches in the switch carrier 44 are several proximity switch cams which are supported in grooves 43 of the cover 39. These proximity switch cams consist of cam blocks 40a, 40b, etc., which are adjustably clamped to the switch housing cover 39 by means of clamping brackets 42 and clamping screws 41 which include means for longitudinal fine-adjustment (not shown). The proximity switch cams produce a switching action by magnetically interacting with the switches in the switch carrier 44.

It should be understood, of course, that the foregoing disclosure describes only preferred embodiments of the invention and that it is intended to cover all changes and modifications of these examples of the invention which fall within the scope of the appended claims.

I claim the following:

1. A drive for rotary switching controls of an injection molding machine capable of producing a precise, backlach-free translation of lineal relative movements between two units of said machine into corresponding angular displacements of the moving member of a rotary switching signal giver, such as, for example, the wiper of a rotary potentiometer, thereby controlling switching actions, such as the starting and/or stopping of relative movements between the two machine units, the switching controls drive comprising in combination:

a length of timing belt forming a closed loop;

two belt rollers which are supported and journalled on a first one of the two machine units, on rotational axes which are perpendicular to the direction of relative movement of the machine units and rigidly spaced in such a way that the rollers carry the timing belt in a taut oblong loop and at least one belt run is oriented parallel to the movement direction;

means for longitudinally resetting the rigid spacing between the two belt rollers;

means for rotationally connecting one of the two belt rollers to said rotary switching signal giver;

a follower clamp arranged on the parallel-oriented belt run of the timing belt, the follower clamp serving as a belt buckle by holding both extremities of the timing belt length in a longitudinally preloaded locking connection; and means for fixedly attaching the follower clamp to the second one of the machine units.

2. A drive for rotary switching controls as defined in claim 1, further comprising cover means surrounding and at least substantially enclosing the two belt rollers and the timing belt, the cover means being part of the first machine unit.

3. A drive for rotary switching controls as defined in claim 2, wherein the cover means is a narrow, elongated guard case, defining journal supports for the two belt rollers in one of its walls; and the guard case includes the two belt rollers, the timing belt, and the resetting means for the roller spacing, in the form of a self-contained assembly which is removably attached to the first machine unit.

4. A drive for rotary switching controls as defined in claim 2 or claim 3, wherein the cover means includes a wall portion with an aperture through which the follower clamp attachment means reaches to the inside of the cover means.

* * * * *